United States Patent
Murthy-Bellur et al.

(10) Patent No.: US 10,050,534 B1
(45) Date of Patent: Aug. 14, 2018

(54) SYSTEMS AND METHODS FOR SELF-ADAPTIVE CURRENT CONTROL

(71) Applicant: Cummins Power Generation IP, Inc., Minneapolis, MN (US)

(72) Inventors: Subbarao Dakshina Murthy-Bellur, Minneapolis, MN (US); Heng Yang, Marietta, GA (US); Minyu Cai, West Lafayette, IN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 0 days.

(21) Appl. No.: 15/595,508

(22) Filed: May 15, 2017

(51) Int. Cl.
 *H02M 3/24* (2006.01)
 *H02M 3/315* (2006.01)
 *H01F 27/42* (2006.01)
 *H02M 1/00* (2006.01)

(52) U.S. Cl.
 CPC ............ *H02M 3/24* (2013.01); *H01F 27/425* (2013.01); *H01F 27/427* (2013.01); *H02M 3/315* (2013.01); *H02M 2001/0009* (2013.01); *H02M 2001/0054* (2013.01); *H02M 2001/0064* (2013.01)

(58) Field of Classification Search
 CPC ......... H02M 3/33507; H02M 3/33576; H02M 3/33592
 USPC ...................................... 363/17, 98
 See application file for complete search history.

(56) References Cited

U.S. PATENT DOCUMENTS

| | | |
|---|---|---|
| 5,355,294 A | 10/1994 | De Doncker et al. |
| 5,481,449 A | 1/1996 | Kheraluwala et al. |
| 8,587,975 B2 | 11/2013 | Jain et al. |
| 9,190,915 B2 * | 11/2015 | Inoue ................ H02M 3/33507 |
| 9,300,219 B2 | 3/2016 | Hirano |
| 9,438,126 B2 | 9/2016 | Hirano |

(Continued)

FOREIGN PATENT DOCUMENTS

| | | |
|---|---|---|
| CN | 103516224 | 1/2014 |
| CN | 103916019 | 7/2014 |
| JP | 2012-065511 | 3/2012 |

OTHER PUBLICATIONS

Bai, Hua et al., "Eliminate reactive power and increase system efficiency of isolated bidirectional dual-active-bridge DC/DC converters using novel dual-phase-shift control." IEEE Transactions on Power Electronics 23, No. 6 (2008): 2905-2914.

(Continued)

*Primary Examiner* — Jeffrey Sterrett
(74) *Attorney, Agent, or Firm* — Foley & Lardner LLP (57) ABSTRACT

The present disclosure relates to electric converters and methods of controlling the same. One dual-active-bridge direct current to direct current (DC-DC) converter includes a transformer having a primary winding and a secondary winding, a first H-bridge connected to the primary winding, a second H-bridge connected to the secondary winding, and a current sensor structured to measure a current of the transformer. The first H-bridge includes a plurality of switch devices. The second H-bridge includes a plurality of switch devices. The dual-active-bridge DC-DC converter further includes a controller configured to control an on/off state for each of the plurality of switch devices of the first H-bridge and the plurality of switch devices of the second H-bridge based at least in part on the current of the transformer measured by the current sensor.

28 Claims, 8 Drawing Sheets

(56) References Cited

U.S. PATENT DOCUMENTS

| | | | |
|---|---|---|---|
| 9,621,056 | B2 | 4/2017 | Wu et al. |
| 9,742,296 | B2 | 8/2017 | Inoue et al. |
| 9,837,919 | B2 | 12/2017 | Yoo et al. |
| 9,853,557 | B2 | 12/2017 | Hirano |
| 2009/0196072 | A1 | 8/2009 | Ye |
| 2011/0249472 | A1 | 10/2011 | Jain et al. |
| 2014/0185328 | A1* | 7/2014 | Rosado .................. H02M 1/40 363/17 |
| 2015/0171729 | A1* | 6/2015 | Scandola .............. H02M 3/158 363/21.02 |
| 2015/0303815 | A1 | 10/2015 | Chen et al. |
| 2015/0349647 | A1 | 12/2015 | Zane et al. |
| 2015/0349649 | A1* | 12/2015 | Zane ................ H02M 3/33507 363/21.03 |
| 2016/0139651 | A1 | 5/2016 | Schramm et al. |
| 2017/0310229 | A1* | 10/2017 | Fujisaki ............ H02M 3/33576 |
| 2018/0026540 | A1 | 1/2018 | Chen et al. |

OTHER PUBLICATIONS

Demetriades, Georgios D. et al., "Dynamic modeling of the dual-active bridge topology for high-power applications." In Power Electronics Specialists Conference, pp. 457-464. 2008.

Giuliani, Francesco et al., "Soft-starting procedure for dual active bridge converter." In Control and Modeling for Power Electronics (COMPEL), 2015 IEEE 16th Workshop on, pp. 1-6. IEEE, 2015.

Harrye, Yasen A. et al., "Reactive Power Minimization of Dual Active Bridge DC/DC Converter with Triple Phase Shift Control using Neural Network." 3rd International Conference on Renewable Energy Research and Applications, pp. 566-571. Oct. 22, 2014.

Jain, Amit Kumar et al., "PWM control of dual active bridge: Comprehensive analysis and experimental verification." IEEE Transactions on Power Electronics 26, No. 4 (2011): 1215-1227.

Krismer, Florian et al., "Accurate small-signal model for the digital control of an automotive bidirectional dual active bridge." IEEE transactions on power electronics 24, No. 12 (2009): 2756-2768.

M. Kim et al., "A dual-phase-shift control strategy for dual-active-bridge DC-DC converter in wide voltage range," Power Electronics and ECCE Asia (ICPE & ECCE), 2011 IEEE 8th International Conference on, Jeju, 2011, pp. 364-371.

X. Liu et al., "Novel Dual Phase Shift Control with Bi-directional Inner phase shifts for Dual Active Bridge Converter Having Low Surge Current and Stable Power Control." IEEE Transactions on Power Electronics 32, No. 5 (Jul. 22, 2016): 4095-4106.

Zhao, Biao et al., "Universal high-frequency-link characterization and practical fundamental-optimal strategy for dual-active-bridge DC-DC converter under PWM plus phase-shift control." IEEE Transactions on Power Electronics 30, No. 12 (2015): 6488-6494.

Zhou, Haihua et al., "Interleaved bi-directional dual active bridge DC-DC converter for interfacing ultracapacitor in micro-grid application." In 2010 IEEE International Symposium on Industrial Electronics, pp. 2229-2234. IEEE, 2010.

Zhu, Zhonghu et al., "Analysis of the startup method for building up Dc voltage via body diode rectifying in Dual Active Bridge converter." In Electronics and Application Conference and Exposition (PEAC), 2014 International, pp. 1407-1410. IEEE, 2014.

B. Zhao et al., "Overview of Dual-Active-Bridge Isolated Bidirectional DC-DC Converter for High-Frequency-Link Power-Conversion System," in IEEE Transactions on Power Electronics, vol. 29, No. 8, pp. 4091-4106, Aug. 2014.

* cited by examiner

SYSTEMS AND METHODS FOR SELF-ADAPTIVE CURRENT CONTROL

FIELD

This present disclosure relates to electrical converters.

BACKGROUND

Isolated DC-DC converters are widely used in DC-DC power conversion applications. For example, an isolated DC-DC converter can be used to interface a low-voltage battery to a high-voltage battery or a high-voltage DC bus. As used herein, the term "isolated" refers to the existence of an electrical barrier between the input and output of a DC-DC converter. It is desirable to utilize converters that are reliable, modular, and less expensive.

SUMMARY

One embodiment relates to a dual-active-bridge (DAB) direct current to direct current (DC-DC) converter. The converter includes a transformer including a primary winding and a secondary winding, a first H-bridge connected to the primary winding, a second H-bridge connected to the secondary winding, and a current sensor structured to measure a current of the transformer. The first H-bridge includes a plurality of switch devices. The second H-bridge includes a plurality of switch devices. The converter further includes a controller configured to control an on/off state for each of the plurality of switch devices of the first H-bridge and the plurality of switch devices of the second H-bridge based at least in part on the current of the transformer measured by the current sensor.

Another embodiment relates to a controller for controlling a dual-active-bridge (DAB) direct current to direct current (DC-DC) converter that includes a transformer, a first H-bridge connected to a primary winding of the transformer, and a second H-bridge connected to a secondary winding of the transformer. The controller includes a voltage controller, a current controller, an inner phase-shift angle determination circuit, and a pulse width modulation (PWM) generator. The voltage controller is configured to determine a reference current based on a reference voltage and a DC voltage output from the second H-bridge. The current controller is configured to determine an outer phase-shift angle based on the reference current and a DC current output from the second H-bridge. The outer phase-shift angle is a phase shift between a voltage on the primary winding and the voltage on the secondary winding. The inner phase-shift angle determination circuit is configured to determine a first inner phase-shift angle which is a zero-voltage time of a first voltage on the primary winding and a second inner phase-shift angle which is a zero-voltage time of the second voltage on the secondary winding based on a current of the transformer measured by a current sensor. The pulse width modulation (PWM) generator is configured to generate signals to control switch devices on the first H-bridge and the second H-bridge based on the outer phase-shift angle, the first inner phase-shift angle, and the second inner phase-shift angle.

Yet another embodiment relates to a method for controlling a dual-active-bridge (DAB) direct current to direct current (DC-DC) converter. The converter includes a transformer, a first H-bridge connected to a primary winding of the transformer, and a second H-bridge connected to a secondary winding of the transformer. The method includes determining a reference current based on a reference voltage and a DC voltage output from the second H-bridge, and determining an outer phase-shift angle based on the reference current and a DC current output from the second H-bridge. The outer phase-shift angle is a phase shift between a voltage on the primary winding and the voltage on the secondary winding. The method further includes determining a first inner phase-shift angle which is a zero-voltage time of a first voltage on the primary winding and a second inner phase-shift angle which is a zero-voltage time of a second voltage on the secondary winding based on a current of the transformer measured by a current sensor, and generating signals to control switch devices on the first H-bridge and the second H-bridge based on the outer phase-shift angle, the first inner phase-shift angle, and the second phase-shift angle.

These and other features, together with the organization and manner of operation thereof, will become apparent from the following detailed description when taken in conjunction with the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Dual-active-bridge (DAB) DC-DC converters can be used in DC-DC power conversion applications, for example, as an interface between a low-voltage battery and a high-voltage battery or a high-voltage DC bus. A DAB DC-DC converter includes an H-bridge on each of the input and output sides of an isolation transformer, each H-bridge having a plurality of switch devices. Because the power transmission of the DAB DC-DC converter depends on the leakage inductance of the transformer, the RMS value of the current of the transformer can be very high when the voltage conversion ratio of the converter does not match the transformer turns ratio. Phase shift control methods can be used to decrease the transformer RMS current, in which the switch devices of the two H-bridges are switched according to inner phase-shift angles. Typically, the inner phase-shift angles are determined based on analytical expressions depending on circuit parameters (e.g., inductance, resistance, capacitance), or based on look-up tables derived from experiments/simulations in advance. However, when circuit parameters change due to, for example, components aging, temperature fluctuation, changes of other environmental factors, etc., these methods might not be as effective.

Referring to the figures generally, various embodiments disclosed herein relate to systems and methods of self-adaptive current control for a DAB DC-DC converter. In some embodiments, a current sensor is used to measure the current of the transformer. The inner phase-shift angles are adjusted iteratively based on the measured current. If a change of the inner phase-shift angles reduces the RMS value of the current, the next change of the inner phase-shift angles goes the same direction. If a change of the inner phase-shift angles increases the current, the next change of the inner phase-shift angles goes the opposite direction. Thus, the RMS value of the current is gradually reduced and may eventually converge to a minimum value. In some embodiments, the inner phase-shift angles are adapted during the operation of the DAB DC-DC converter on a real-time basis, and the analytical expression and experiments/simulations in advance are not needed. Furthermore, the transformer current can be reduced irrespective of the power level, the voltage conversion ratio, and variation of circuit parameters of the converter.

Figure 1:
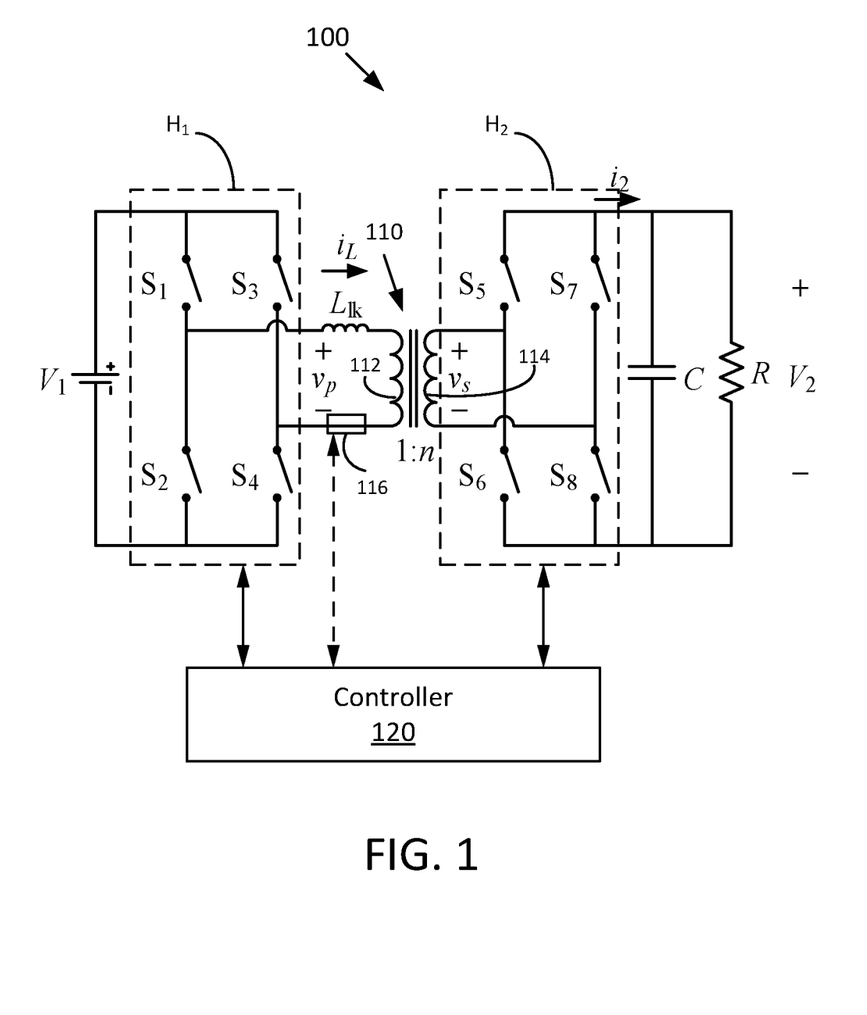
FIG. 1 is a schematic diagram of a dual-active-bridge (DAB) DC-DC converter according to an example embodiment.

Referring to FIG. 1, a schematic diagram of a DAB DC-DC converter 100 is shown according to an example embodiment. The DAB DC-DC converter 100 includes a transformer 110, a first H-bridge $H_1$, a second H-bridge $H_2$, and a controller 120. The transformer 110 includes a primary winding 112 and a secondary winding 114. The first H-bridge $H_1$ is connected to the primary winding 112 and includes switch devices $S_1$ and $S_2$ on one leg of the bridge and switch devices $S_3$ and $S_4$ on the other leg of the bridge. The second H-bridge $H_2$ is connected to the secondary winding 114 and includes switch devices $S_5$ and $S_6$ on one leg of the bridge and switch devices $S_7$ and $S_8$ on the other leg of the bridge. Each of the switch devices $S_1$ through $S_8$ can be either at an "on" state or an "off" state. At the on-state, circuits on two sides of the switch device are connected. At the off-state, circuits on two sides of the switch device are disconnected. A current sensor 116 measures a current $i_L$ of the transformer 110. The controller 120 controls the on/off state for each of the switch devices $S_1$ through $S_8$ based at least in part on the current $i_L$ measured by the current sensor 116.

The transformer 110 may be a high-frequency isolation transformer. The primary winding 112 and the secondary winding 114 are electromagnetically coupled. In some embodiments, the primary and secondary windings 112 and 114 are wrapped around a transformer core of high magnetic permeability (e.g., a magnetic or ferrous core) so that the magnetic flux passes through both the primary and secondary windings 112 and 114. A varying current (e.g., an alternating current) applied to the primary winding 112 through the first bridge $H_1$ may create a varying magnetic flux in the transformer core and a varying magnetic field impinging on the secondary winding 114. The varying magnetic field at the secondary winding 114 may induce a varying voltage in the secondary winding due to electromagnetic induction. In practice, some magnetic flux generated by the primary winding 112 traverse paths outside the windings. Such flux is referred to as leakage flux, which results in leakage inductance $L_{lk}$ in series with the primary and secondary windings 112 and 114. In some embodiments, the transformer 110 further includes an external inductor in series with the primary and secondary windings 112 and 114. The inductance of the external inductor adds to the leakage inductance $L_{lk}$ in circuit modeling.

The first H-bridge $H_1$ is structured to convert a DC voltage $V_1$ provided by a DC source (e.g., a battery) to an AC voltage applied on the primary winding 112 of the transformer 110. The DC-AC conversion is performed by controlling the on/off state of the switch devices $S_1$ through $S_4$. In particular, in some implementations, the voltage applied on the primary winding 112 when $S_1$ and $S_4$ are on while $S_2$ and $S_3$ are off is opposite to the voltage applied when $S_2$ and $S_3$ are on while $S_1$ and $S_4$ are off, and the voltage applied on the primary winding 112 when switches $S_1$ ($S_2$) and $S_3$ ($S_4$) are on while switches $S_2$ ($S_1$) and $S_4$ ($S_3$) are off is zero. The switch devices $S_1$ through $S_4$ may be insulated gate bipolar transistors (IGBTs), metal oxide semiconductor field effect transistors (MOSFETs), junction field effect transistors (JFETs), or any other suitable switch devices.

The second H-bridge $H_2$ is structured to convert an AC voltage on the secondary winding 114 to a DC voltage $V_2$ applied on a load R. The AC-DC conversion is performed by controlling the on/off state of the switch devices $S_5$ through $S_8$. When $S_5$ and $S_8$ are on while $S_6$ and $S_7$ are off, $i_2$ has the same polarity as $i_L$. When $S_6$ and $S_7$ are on while $S_5$ and $S_8$ are off, $i_2$ has the polarity opposite to $i_L$. When $S_5$ and $S_7$ are on (off) while $S_6$ and $S_8$ are off (on), $i_2$ is zero. By controlling $S_5$ through $S_8$, the AC current $i_L$ is converted to $i_2$ which has a positive average value. Current $i_2$ is filtered by an output capacitor C and becomes a DC current going into the load R. The switch devices $S_5$ through $S_8$ may be IGBTs, MOSFETs, JFETs, and so on. The controller 120 controls the on/off state for each of the switch device $S_1$ through $S_8$. The structure of the controller 120 is discussed below in detail with reference to FIG. 5.

As discussed above, when the voltage conversion ratio (i.e., $V_1:V_2$) does not match the transformer turns ratio (i.e., 1:n), an excessive component of current $i_L$ may flow through the transformer 110 in comparison with the current $i_L$ when the voltage conversion ratio equals the transformer turns ratio. For example, if the input and output voltages are fixed and the turns ratio matches, e.g., $V_1$=12 V, $V_2$=360 V, and n=30, no excessive transformer current ensues ($V_1:V_2$=1:n). If the output voltage has a range, e.g., $V_1$=12 V, $V_2$=200-400 V, n=25, excessive transformer current may ensue for output voltages higher or lower than 300 V ($V_1:V_2 \neq$1:n). The transformer current may be high when the output voltage is substantially higher or lower than 300 V. The current sensor 116 is used to measure the current $i_L$. In some embodiments, the current sensor 116 measures a root means square (RMS)

value of $i_L$. The current sensor 116 may be connected in series with the primary winding 112 (measuring $i_L$) or in series with the secondary winding 114 (measuring $i_L/n$). The current $i_L$ may cause fluctuation of the current $i_2$ that flows through the load R. In some embodiments, a capacitor C is used to absorb the fluctuation.

Figure 2A:
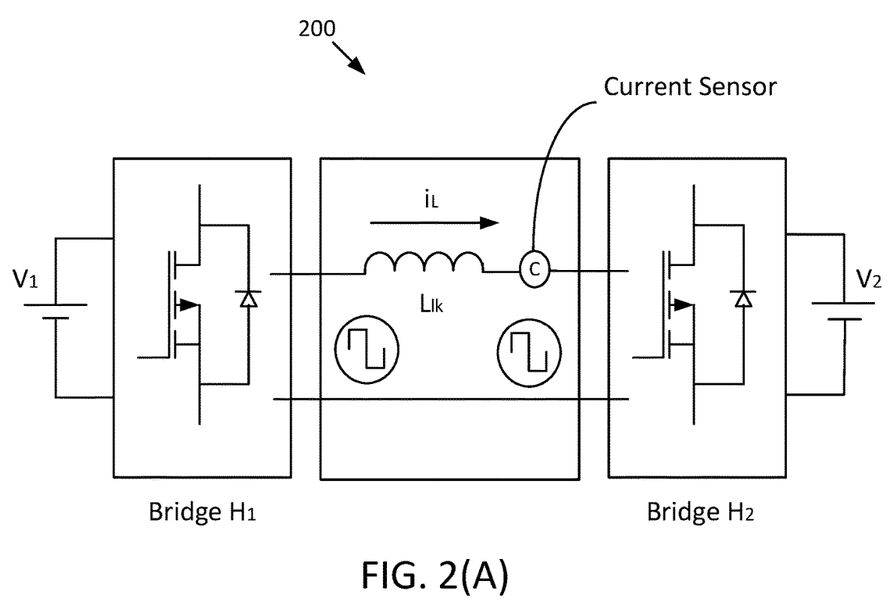
FIG. 2(A) is a schematic diagram of an equivalent circuit for the DAB DC-DC converter of FIG. 1.
Figure 2B:
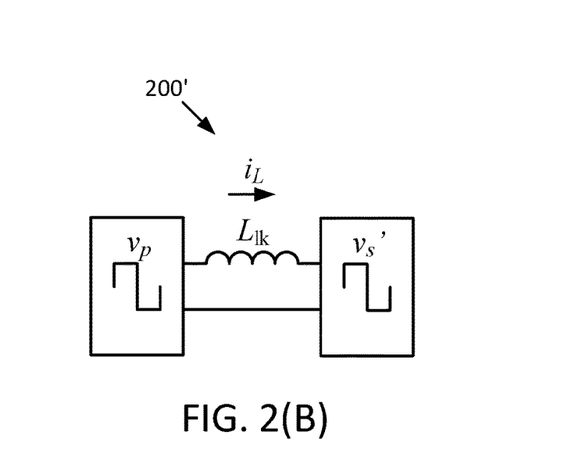
FIG. 2(B) is a schematic diagram of a simplified equivalent circuit for the DAB DC-DC converter of FIG. 1.

Referring to FIGS. 2(A) and 2(B), a schematic diagram of an equivalent circuit 200 for the DAB DC-DC converter 100 of FIG. 1 is shown in FIG. 2(A), and a simplified equivalent circuit 200' is shown in FIG. 2(B). In operation, the DAB DC-DC converter 100 can be equivalent to a DC source $V_1$ connected to one side of an inductor $L_{lk}$ through an inverter bridge $H_1$ and a DC source $V_2$ connected to the other side of the inductor $L_{lk}$ through a rectifier bridge $H_2$, as shown in FIG. 2(A). In a simplified equivalent circuit 200', the DAB DC-DC converter 100 can be equivalent to two high frequency AC sources $v_p$ and $v_s'$ (converted from $v_s$ to address the transformer turns ratio) connected in both sides of an inductor with the leakage inductance $L_{lk}$, as shown in the FIG. 2(B).

Figure 3:
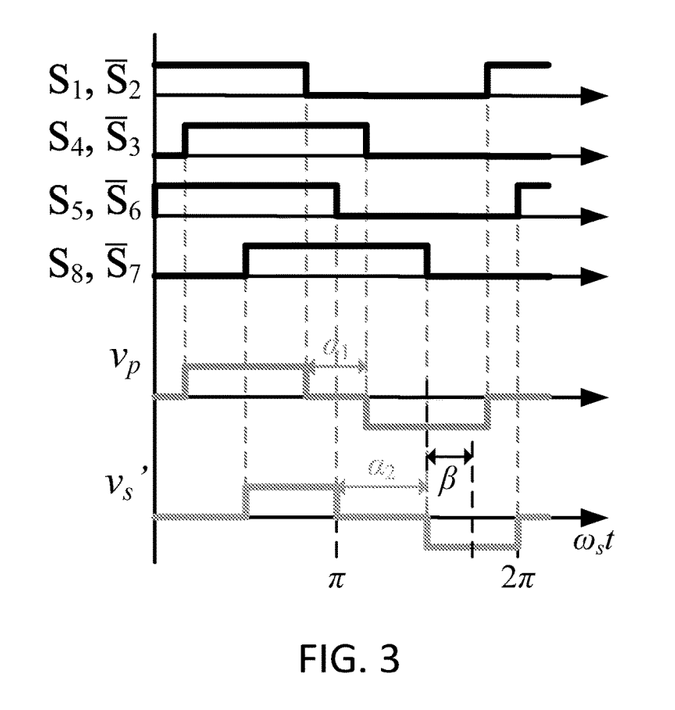
FIG. 3 is a graph of waveforms of the control signals and waveforms of the input and output voltage for a DAB DC-DC converter according to an example embodiment.

Referring to FIG. 3, a graph of waveforms of control signals and waveforms of the input and output voltages for a DAB DC-DC converter (e.g., DAB DC-DC converter 100 of FIG. 1) is shown according to an example embodiment. Switch devices disposed on the same leg of a bridge (e.g., $H_1$, $H_2$) are driven with complimentary (i.e., opposite) square wave pulses. For example, the waveforms of the control signals for switch devices $S_1$ and $S_2$ are complimentary. $S_3$ and $S_4$ form a complimentary pair; $S_5$ and $S_6$ form a complimentary pair; and $S_7$ and $S_8$ form a complimentary pair. As a result, the AC voltage $v_p$ on the primary winding and the AC voltage $v_s'$ on the secondary winding are also square waves. In particular, the polarity of the voltage $v_p$ is positive (+) when $S_1$ and $S_4$ are both on (i.e., the control signal is 1), is negative (−) when $S_2$ and $S_3$ are both on, and is zero (0) otherwise. The polarity of the voltage $v_s'$ is positive (+) when $S_5$ and $S_8$ are both on, is negative (−) when $S_6$ and $S_7$ are both on, and is zero (0) otherwise.

The phase difference between the voltages $v_p$ and $v_s'$ is defined as an outer phase-shift angle β. The outer phase-shift angle β controls the direction and magnitude of power transmission of the DAB DC-DC converter 100. When β is positive, the voltage $v_p$ on the primary winding 112 leads the voltage $v_s'$ on the secondary winding 114, and the power is transmitted from the primary winding side to the secondary winding side. When β is negative, the voltage $v_p$ on the primary winding 112 lags behind the voltage $v_s'$ on the secondary winding 114, and the power is transmitted from the secondary winding side to the primary winding side.

The zero-voltage time of the voltage $v_p$ on the primary winding 112 is defined as a first inner phase-shift angle $α_1$. The zero-voltage time of the voltage $v_s'$ on the secondary winding 114 is defined as a second inner phase-shift angle $α_2$. The transformer current can be changed by controlling the first and second inner phase-shift angles $α_1$ and $α_2$. There are various controlling schemes that combine $α_1$, $α_2$, and β in various ways. For example, in the single phase-shift (SPS) control, $α_1$ and $α_2$ are maintained at zero (0) while β can be changed. In the dual phase-shift (DPS) control, $α_1$ and $α_2$ are equal to each other and neither is zero, and β can be changed. In the extended phase-shift (EPS) control, one of $α_1$ and $α_2$ is maintained at zero and the other is non-zero, and β can be changed. In the triple phase-shift (TPS) control, $α_1$ and $α_2$ are not equal to each other and neither is zero, and β can be changed.

Figure 4A:
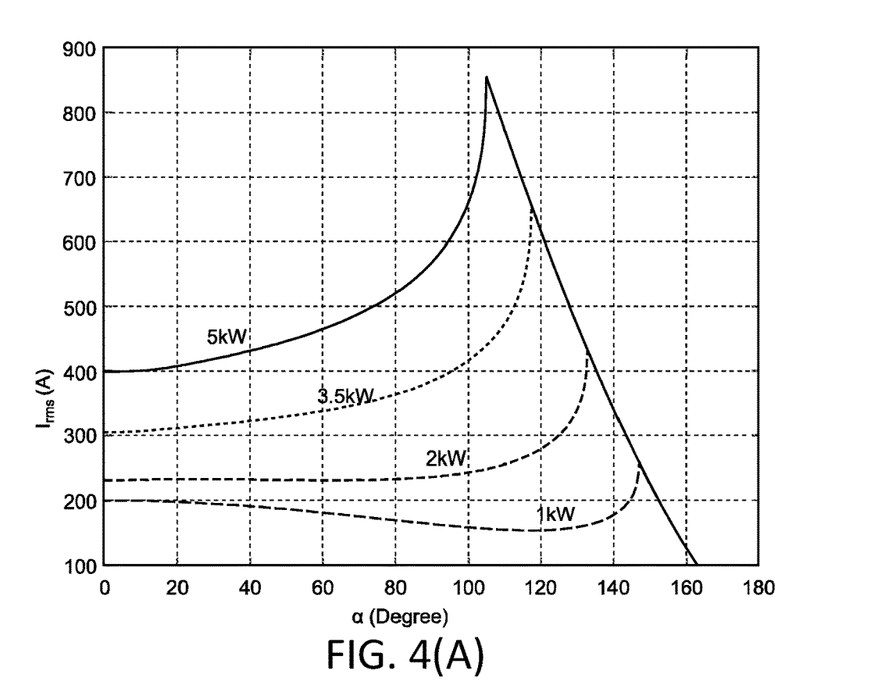
FIG. 4(A) is a graph of the theoretical relationship between the root means square (RMS) value of the transformer current and the inner phase-shift angle according to an example embodiment.
Figure 4B:
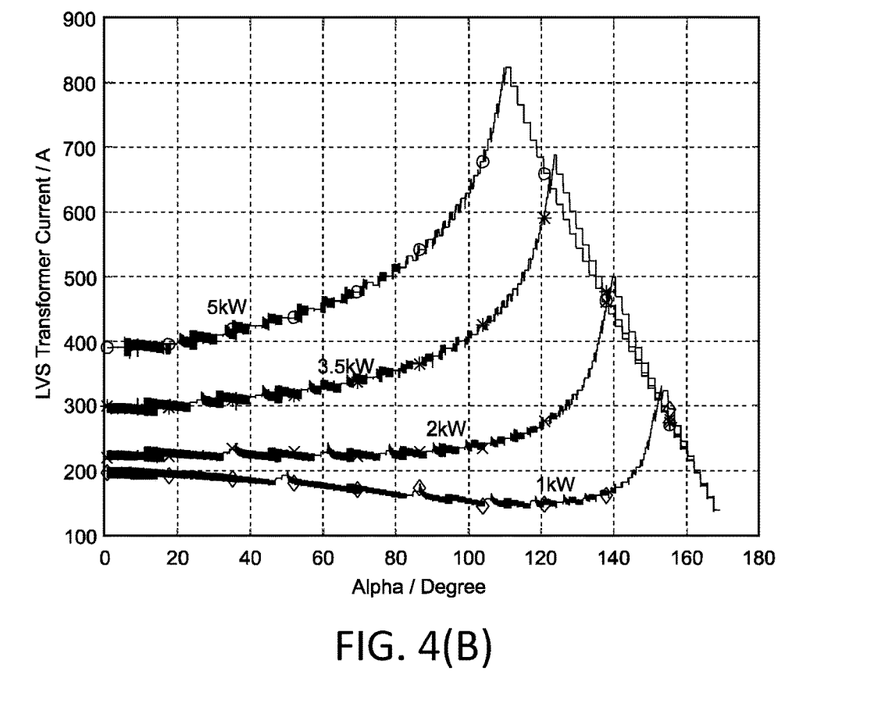
FIG. 4(B) is a graph of the relationship between the RMS value of the transformer current and the inner phase-shift angle derived by simulation according to an example embodiment.

Referring to FIGS. 4(A) and 4(B), relationship between the RMS value of the transformer current $I_{rms}$ and the inner phase-shift angle(s) is shown according to an example embodiment. The graph of FIG. 4(A) shows the theoretical relationship for a DAB DC-DC converter in which the DC voltage $V_1$ on the primary winding side is 14 V and the DC voltage $V_2$ on the secondary winding side is maintained at 400 V by controlling β. It is assumed that the first inner-phase shift angle $α_1$ equals the second inner-phase shift angle $α_2$, i.e., $α_1=α_2=α$. As shown, α varies over a range of 0-180 degrees. The graph of FIG. 4(B) shows the relationship between $I_{rms}$ and α derived by a simulation, e.g., a Matlab/Simulink simulation, for the same converter. The curves in FIGS. 4(A) and 4(B) correspond to various power transmission levels, including 1 kW, 2 kW, 3.5 kW, and 5 kW. The theoretical relationship shown in FIG. 4(A) shows substantially the same trends as the simulated relationship shown in FIG. 4(B). As shown, the RMS current $I_{rms}$ is correlated to α and the relationship curves are substantially smooth. In addition, a global minimum of $I_{rms}$ exists on each curve at a particular α.

Figure 5:
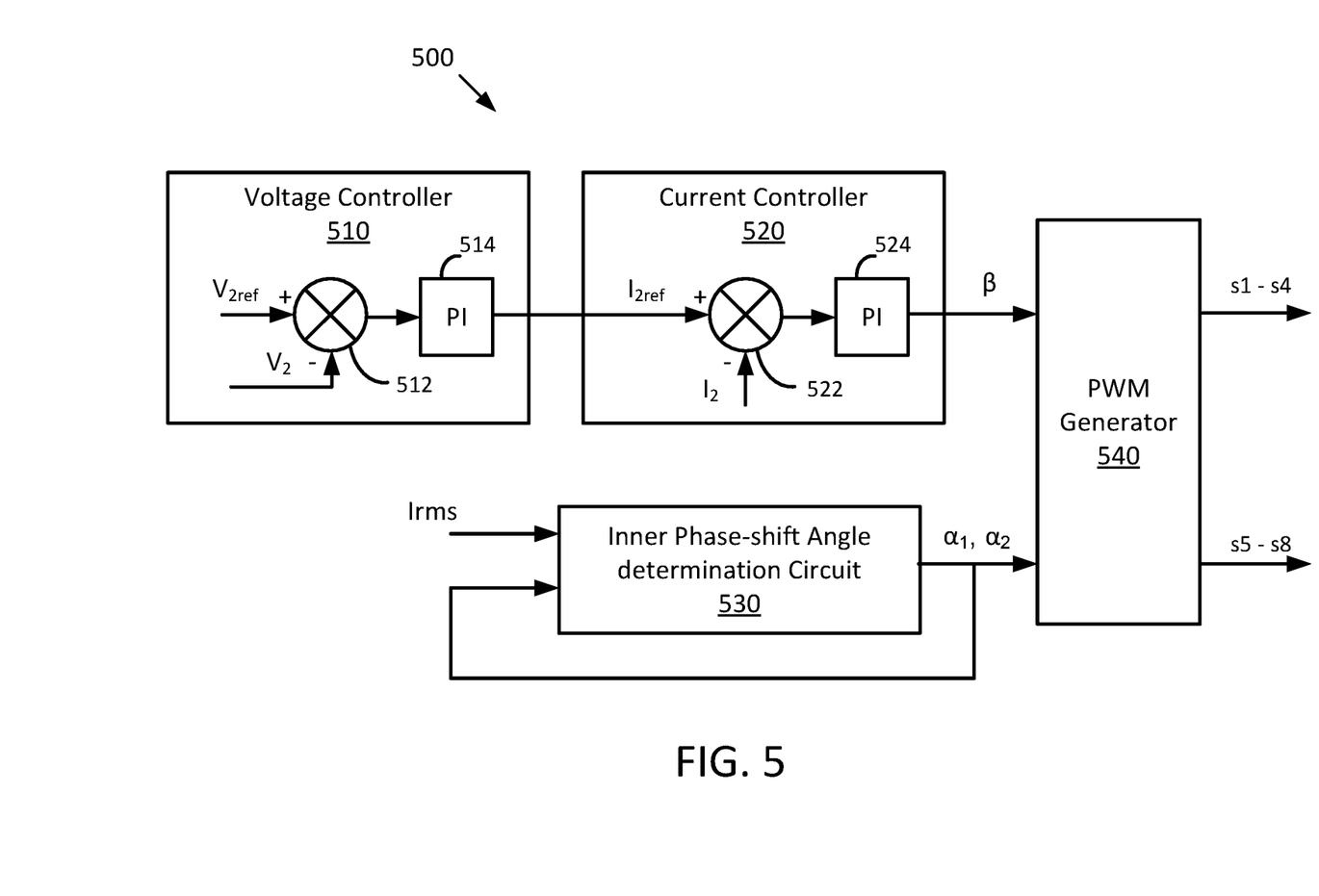
FIG. 5 is a schematic diagram of a controller for a DAB DC-DC converter according to an example embodiment.

Referring to FIG. 5, a schematic diagram of a controller 500 for a DAB DC-DC converter (e.g., the DAB DC-DC converter 100 of FIG. 1) is shown according to an example embodiment. The controller 500 includes a voltage controller 510, a current controller 520, an inner phase-shift angle determination circuit 530, and a PWM generator 540. In operation, the voltage controller 510 and the current controller 520 determine the outer phase-shift angle β. The inner phase-shift angle determination circuit 530 determines the first and second inner phase-shift angle $α_1$ and $α_2$. The PWM generator 540 generates control signals to control the on/off state for each of the switch device $S_1$ through $S_8$ based on the determined outer phase-shift angle β and the first and second inner phase-shift angle $α_1$ and $α_2$.

The voltage controller 510 includes a first comparator 512 and a first proportional integral (PI) loop. The first comparator 512 is structured to compare a reference voltage $V_{2ref}$ with the DC voltage $V_2$ applied on the load R. In some embodiments, $V_2$ is measured by a voltage sensor and $V_{2ref}$ is a predetermined voltage level (e.g., nominal output voltage). The output of the first comparator 512 (e.g., the difference between $V_2$ and $V_{2ref}$) is fed to the first PI loop 514. The first PI loop 514 may implement a reference current generation process that outputs a reference current $I_{2ref}$ based on the output of the first comparator 512. In particular, the first PI loop 514 may attempt to reduce (e.g., minimize) the difference output by the first comparator 512 by adjusting the reference current $I_{2ref}$. The reference current $I_{2ref}$ is provided to the current controller 520. The current controller includes a second comparator 522 and a second PI loop 524. The second comparator 522 compares the reference current $I_{2ref}$ with the DC current $I_2$ flowing through the load R. The output of the second comparator 522 (e.g., the difference between $I_2$ and $I_{2ref}$) is fed to the second PI loop 524. The second PI loop 524 may implement an outer phase-shift angle generation process that outputs the outer phase-shift angle β based on the output of the second comparator 522. In particular, the second PI loop 524 may attempt to reduce (e.g., minimize) the difference output by the second comparator 522 by controlling the outer phase-shift angle β.

The inner phase-shift angle determination circuit 530 is structured to determine the first and second inner phase-shift angles $α_1$ and $α_2$ to minimize the RMS-current ($I_{rms}$) flowing through the transformer, using the current RMS value as a feedback. The process of reducing the RMS value $I_{rms}$ of the transformer current is discussed below in detail with reference to FIG. 6.

Control signals for the switch devices $S_1$ through $S_8$ can be determined when the outer phase-shift angle β and the first and second inner phase-shift angles $α_1$ and $α_2$ are known, as shown by FIG. 3. The PWM generator 540 thus generates the corresponding pulse width modulation signals to control the on/off state for each of the switch devices $S_1$ through $S_8$. It should be understood that each component of the controller 500 may be implemented as software, hard-wired circuit, or any combination thereof. It should also be understood that the components can be integrated in any suitable manner.

Figure 6:
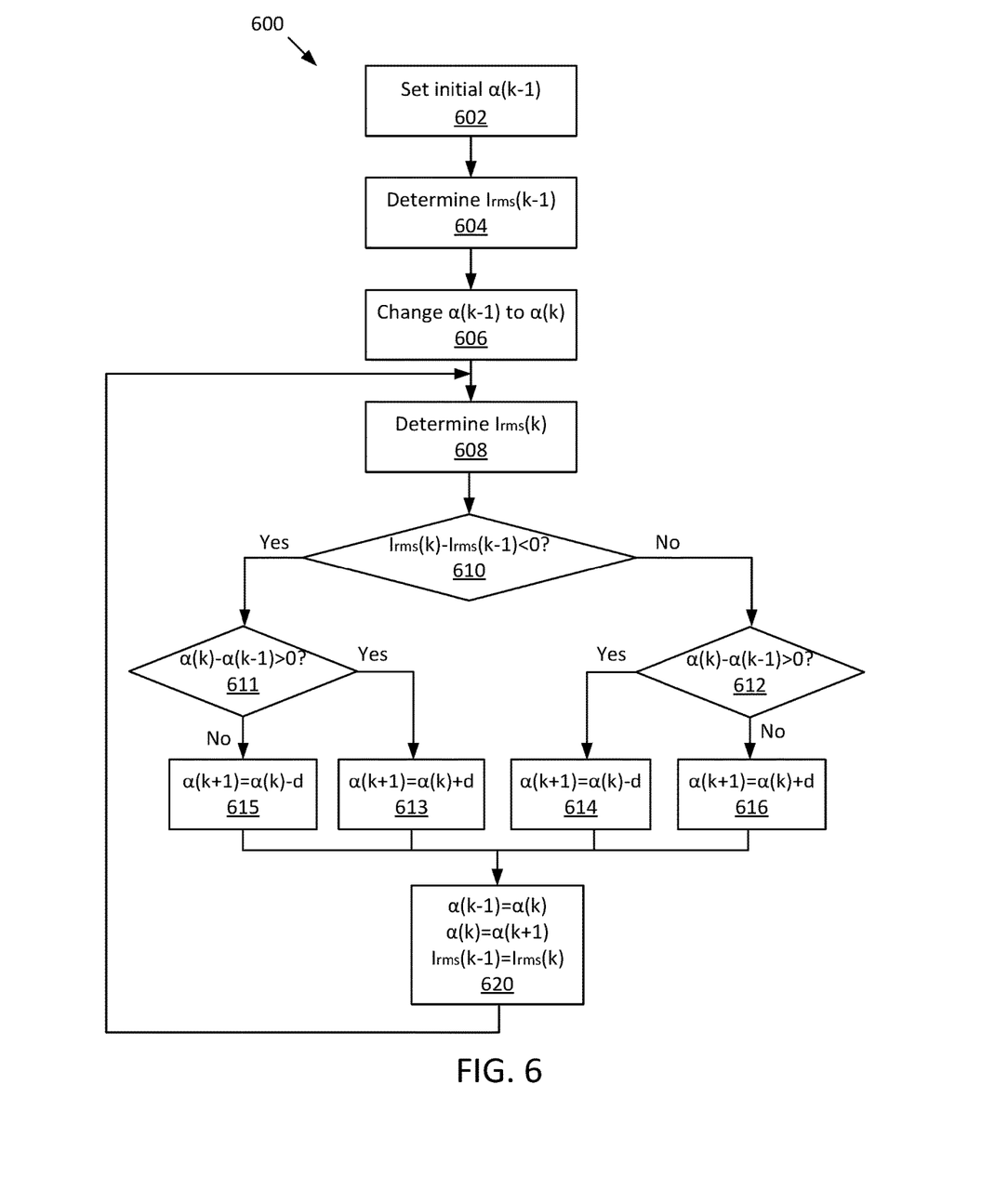
FIG. 6 is a flow diagram of a process for reducing the RMS value of the transformer current according to an example embodiment.

Referring to FIG. 6, a flow diagram of a process 600 for reducing the RMS value of the transformer RMS current for a DAB DC-DC converter (e.g., the DAB DC-DC converter 100 of FIG. 1) is shown according to an example embodiment. The process 600 can be executed by the inner phase-shift angle determination circuit 530. In some embodiments, the process 600 is utilized in a DPS scheme (i.e., $α_1=α_2=α$) to determine a. In some embodiments, the process 600 is utilized in a controlling scheme in which $α_1 \ne α_2$ to determine $α_1$ and $α_2$, respectively.

At an operation 602, an initial value is set for the inner phase-shift angle. In some embodiments, the initial value is selected randomly in a range of, for example, 0-180 degrees. In some embodiments, the initial value is determined analytically using circuit parameters and/or operating parameters. The process 600 may converge faster in the latter situation.

At an operation 604, the RMS value of the transformer current corresponding to the initial value of the inner phase-shift angle is determined. In some embodiments, the RMS current value is received from the currents sensor 116 connected in series with the primary winding 112 or the secondary winding 114.

At an operation 606, the inner phase-shift angle is changed to a value different from the initial value. The change can be either a small increment (e.g., +5 degree) or a small decrement (−5 degree).

At an operation 608, the RMS value of the transformer current corresponding to the inner phase-shift angle after the change is determined. In some embodiments, the RMS current value is received from the current sensor 116, which monitors the transformer current on a real-time basis.

At an operation 610, it is determined whether the RMS value of the transformer current corresponding to the changed inner phase-shift angle is less than the RMS value corresponding to the initial inner phase-shift angle. In other words, it is determined whether the change of the inner phase-shift angle has reduced the RMS value of the transformer current.

If it is determined at the operation 610 that the change of the inner phase-shift angle has reduced the RMS value of the transformer current (i.e., Yes), then, at an operation 611, it is determined whether the changed inner phase-shift angle is greater than the initial inner phase-shift angle. If yes, then, at an operation 613, the inner phase-shift angle is further changed with a small increment. If no, then, at an operation 615, the inner phase-shift angle is further changed with a small decrement. In other words, If the changed inner phase-shift angle has reduced the RMS value of the transformer current, the next change goes the same direction as the previous change (i.e., either increment or decrement).

If it is determined at the operation 610 that the change of the inner phase-shift angle has not reduced the RMS value of the transformer current (i.e., No), then, at an operation 612, it is determined whether the changed inner phase-shift angle is greater than the initial inner phase-shift angle. If yes, then, at an operation 614, the inner phase-shift angle is further changed with a small decrement. If no, then, at an operation 615, the inner phase-shift angle is further changed with a small increment. In other words, If the changed inner phase-shift angle has not reduced the RMS value of the transformer current, the next change goes the opposite direction as the previous change.

At an operation 620, the initial inner phase-shift angle and the inner phase-shift angle after change are updated according the values determined at the operations 613, 614, 615, or 616. The process 600 goes back to the operation 608 to repeat the operations described above. With the iterative process, the RMS value of the transformer current may gradually reduce and eventually converge to a minimum value.

In the systems and methods disclosed herein, because the inner phase-shift angle is self-adapted during the operation of the DAB DC-DC converter on a real-time basis, the analytical expression and experiments/simulations in advance are not needed. Furthermore, the RMS value of the transformer current can be reduced irrespective of the circuit parameter variations and the operation parameter variations of the converter.

Figure 7:
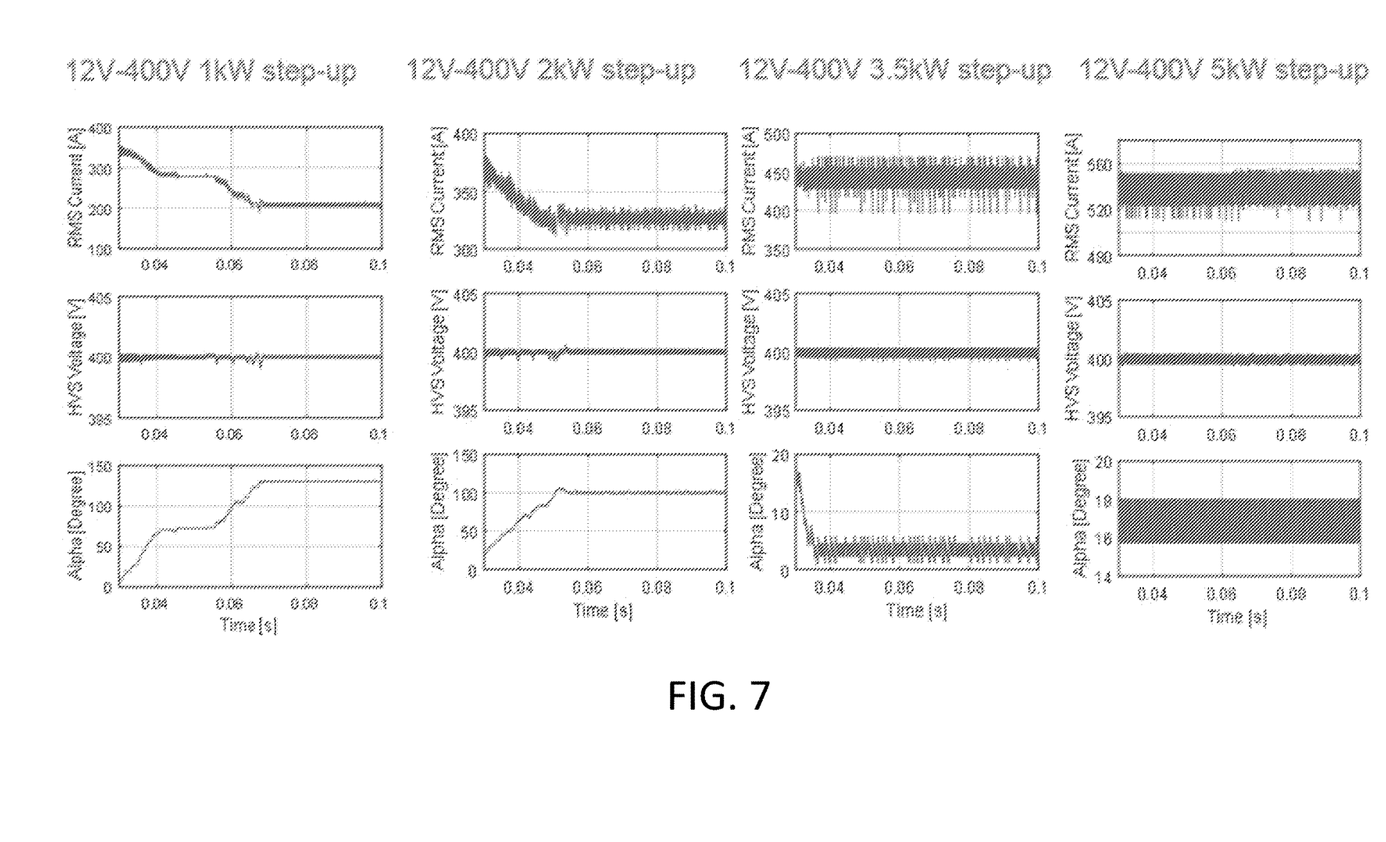
FIG. 7 is graphs showing results of the self-adaptive current control under the step-up mode according to various example embodiments.
Figure 8:
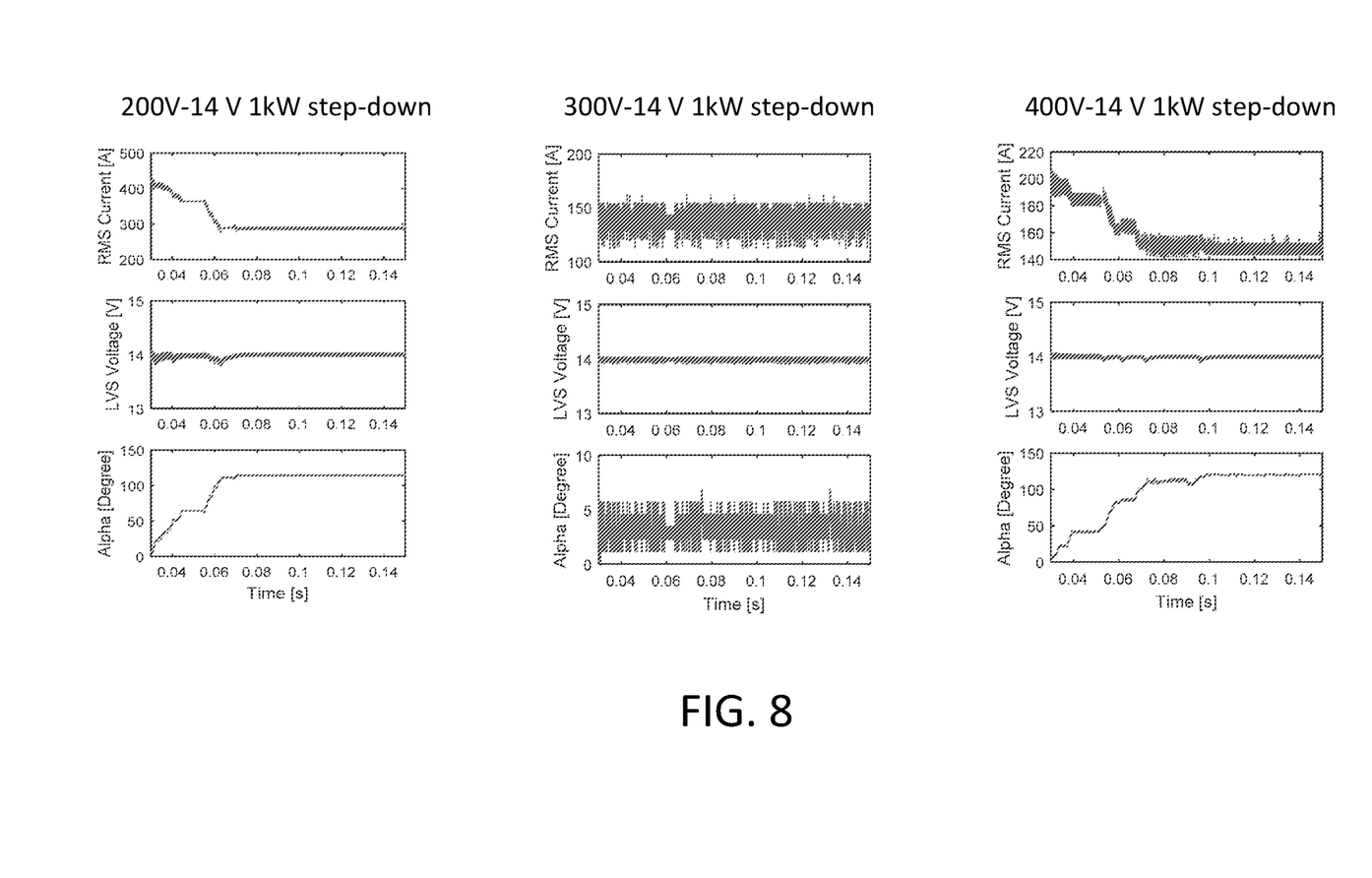
FIG. 8 is graphs showing results of the self-adaptive current control under the step-down mode according to various example embodiments.

Results of the current control method as described herein were simulated using Matlab/Simulink based on an illustrative implementation. FIG. 7 shows the results of current control under the step-up mode (e.g., a boost mode) according to various example embodiments. In the simulation, $V_1=12$ V, $V_2=400$ V, and the converter power varies from 1 kW to 5 kW (e.g., 1 kW, 2 kW, 3.5 kW, and 5 kW). The switching frequency is 50 kHz, the leakage inductance is 41 nH. FIG. 8 shows results of current control under the step-down mode (e.g., buck mode) according to various example embodiments. In the simulation, $V_1=12$ V, $V_2$ varies from 200 V to 400 V (e.g., 200 V, 300 V, and 400 V). The converter power is 1 kW. FIGS. 7 and 8 show that the RMS value of the transformer current has reduced and converged to a minimum value.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Many of the functional units described in this specification have been labeled as circuits, in order to more particularly emphasize their implementation independence. For example, a circuit may be implemented as a hardware circuit including custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A dual-active-bridge direct current to direct current (DC-DC) converter comprising:
   a transformer comprising a primary winding and a secondary winding;
   a first H-bridge connected to the primary winding, the first H-bridge comprising a plurality of switch devices;
   a second H-bridge connected to the secondary winding, the second H-bridge comprising a plurality of switch devices;
   a current sensor structured to measure a current of the transformer; and a controller configured to
control an on/off state for each of the plurality of switch devices of the first H-bridge and the plurality of switch devices of the second H-bridge based at least in part on the current of the transformer measured by the current sensor,
determine an outer phase-shift angle comprising a phase shift between a first voltage on the primary winding and a second voltage on the secondary winding,
determine a first inner phase-shift angle comprising a zero-voltage time of the first voltage and a second inner phase-shift angle comprising a zero-voltage time of the second voltage using the current of the transformer measured by the current sensor as feedback, and
generate signals to control the on/off state each of the plurality of switch devices of the first H-bridge and the plurality of switch devices of the second H-bridge based on the outer phase-shift angle, the first inner-phase shift angle, and the second inner-phase shift angle.

2. The dual-active-bridge DC-DC converter of claim 1, wherein the first H-bridge comprises a first switch device and a second switch device disposed on a first leg of the first H-bridge and a third switch device and a fourth switch device disposed on a second leg of the first H-bridge, wherein the second H-bridge comprises a fifth switch device and a sixth switch device disposed on a first leg of the second H-bridge and a seventh switch device and an eighth switch device disposed on a second leg of the second H-bridge, wherein the on/off states of the first switch device and the second switch device are opposite, the on/off states of the third switch device and the fourth switch device are opposite, the on/off states of the fifth switch device and the sixth switch device are opposite, and the on/off states of the seventh switch device and the eighth switch device are opposite.

3. The dual-active-bridge DC-DC converter of claim 1, wherein the controller is configured to generate pulse width modulation (PWM) signals to control the on/off state for each of the plurality of switch devices of the first H-bridge and the plurality of switch devices of the second H-bridge based at least in part on the current of the transformer measured by the current sensor.

4. The dual-active-bridge DC-DC converter of claim 1, wherein one of the first inner phase-shift angle or the second inner phase-shift angle has a non-zero value, and the other of the first inner phase-shift angle or the second inner phase-shift angle has a zero value.

5. The dual-active-bridge DC-DC converter of claim 1, wherein the controller is configured to reduce a root mean square (RMS) value of the current of the transformer by iteratively adjusting the first inner phase-shift angle and the second inner phase-shift angle.

6. The dual-active-bridge DC-DC converter of claim 1, wherein the controller is configured to:
determine a first RMS value of the current of the transformer corresponding to a first angle value of the first inner phase-shift angle;
change the first inner phase-shift angle to a second angle value;
determine a second RMS value of the current of the transformer corresponding to the second angle value of the first inner phase-shift angle;
determine whether the second RMS value is less than the first RMS value;
determine whether the second angle value is greater than the first angle value; and
change the first inner phase-shift angle to a third value that is greater than the second value in response to determining that the second RMS value is less than the first RMS value and that the second angle value is greater than the first angle value, or in response to determining that the second RMS value is not less than the RMS value and that the second angle value is less than the first angle value.

7. The dual-active-bridge DC-DC converter of claim 1, wherein the controller is configured to:
determine a first RMS value of the current of the transformer corresponding to a first angle value of the first inner phase-shift angle;
change the first inner phase-shift angle to a second angle value;
determine a second RMS value of the current of the transformer corresponding to the second angle value of the first inner phase-shift angle;
determine whether the second RMS value is less than the first RMS value;
determine whether the second angle value is greater than the first angle value; and
change the first inner phase-shift angle to a third value that is less than the second value in response to determining that the second RMS value is less than the first RMS value and that the second angle value is less than the first angle value, or in response to determining that the second RMS value is not less than the RMS value and that the second angle value is greater than the first angle value.

8. The dual-active-bridge DC-DC converter of claim 1, wherein the first inner phase-shift angle has a non-zero value equal to the second inner phase-shift angle.

9. The dual-active-bridge DC-DC converter of claim 1, wherein the first inner phase-shift angle has a first non-zero value, and the second inner phase-shift angle has a second non-zero value different than the first non-zero value.

10. A controller for controlling a dual-active-bridge direct current to direct current (DC-DC) converter that comprises a transformer, a first H-bridge connected to a primary winding of the transformer, and a second H-bridge connected to a secondary winding of the transformer, the controller comprising:
a voltage controller configured to determine a reference current based on a reference voltage and a DC voltage output from the second H-bridge;
a current controller configured to determine an outer phase-shift angle based on the reference current and a DC current output from the second H-bridge, wherein the outer phase-shift angle is a phase shift between a voltage on the primary winding and the voltage on the secondary winding;
an inner phase-shift angle determination circuit configured to determine a first inner phase-shift angle which is a zero-voltage time of a first voltage on the primary winding and a second inner phase-shift angle which is a zero-voltage time of the second voltage on the secondary winding based on a current of the transformer measured by a current sensor; and
a pulse width modulation (PWM) generator configured to generate signals to control switch devices on the first H-bridge and the second H-bridge based on the outer phase-shift angle, the first inner phase-shift angle, and the second inner phase-shift angle.

11. The controller of claim 10, wherein one of the first inner phase-shift angle or the second inner phase-shift angle has a non-zero value, and the other of the first inner phase-shift angle or the second inner phase-shift angle has a zero value.

12. The controller of claim 10, wherein the inner phase-shift angle determination circuit is configured to reduce a root mean square (RMS) value of the current of the transformer by iteratively adjusting the first inner phase-shift angle and the second inner phase-shift angle.

13. The controller of claim 10, wherein the first H-bridge comprises a first switch device and a second switch device disposed on a first leg of the first H-bridge and a third switch device and a fourth switch device disposed on a second leg of the first H-bridge, wherein the second H-bridge comprises a fifth switch device and a sixth switch device disposed on a first leg of the second H-bridge and a seventh switch device and an eighth switch device disposed on a second leg of the second H-bridge, and wherein the PWM generator is structured to generate signals to control the on/off state for each of the first switch device, the second switch device, the third switch device, the fourth switch device, the fifth switch device, the sixth switch device, the seventh switch device, and the eighth switch device based on the outer phase-shift angle, the first inner phase-shift angle, and the second inner phase-shift angle.

14. The controller of claim 13, wherein the on/off states of the first switch device and the second switch device are opposite, the on/off states of the third switch device and the fourth switch device are opposite, the on/off states of the fifth switch device and the sixth switch device are opposite, and the on/off states of the seventh switch device and the eighth switch device are opposite.

15. The controller of claim 13, wherein the inner phase-shift angle determination circuit is configured to:
determine a first RMS value of the current of the transformer corresponding to a first angle value of the first inner phase-shift angle;
change the first inner phase-shift angle to a second angle value;
determine a second RMS value of the current of the transformer corresponding to the second angle value of the first inner phase-shift angle;
determine whether the second RMS value is less than the first RMS value;
determine whether the second angle value is greater than the first angle value; and
change the first inner phase-shift angle to a third value that is greater than the second value in response to determining that the second RMS value is less than the first RMS value and that the second angle value is greater than the first angle value, or in response to determining that the second RMS value is not less than the RMS value and that the second angle value is less than the first angle value.

16. The controller of claim 13, wherein the inner phase-shift angle determination circuit is configured to:
determine a first RMS value of the current of the transformer corresponding to a first angle value of the first inner phase-shift angle;
change the first inner phase-shift angle to a second angle value;
determine a second RMS value of the current of the transformer corresponding to the second angle value of the first inner phase-shift angle;
determine whether the second RMS value is less than the first RMS value;
determine whether the second angle value is greater than the first angle value; and
change the first inner phase-shift angle to a third value that is less than the second value in response to determining that the second RMS value is less than the first RMS value and that the second angle value is less than the first angle value, or in response to determining that the second RMS value is not less than the RMS value and that the second angle value is greater than the first angle value.

17. The controller of claim 10, wherein the first inner phase-shift angle has a non-zero value equal to the second inner phase-shift angle.

18. The controller of claim 10, wherein the first inner phase-shift angle has a first non-zero value, and the second inner phase-shift angle has a second non-zero value different than the first non-zero value.

19. A method for controlling a dual-active-bridge direct current to direct current (DC-DC) converter that comprises a transformer, a first H-bridge connected to a primary winding of the transformer, and a second H-bridge connected to a secondary winding of the transformer, the method comprising:
determining a reference current based on a reference voltage and a DC voltage output from the second H-bridge;
determining an outer phase-shift angle based on the reference current and a DC current output from the second H-bridge, wherein the outer phase-shift angle is a phase shift between a voltage on the primary winding and the voltage on the secondary winding;
determining a first inner phase-shift angle which is a zero-voltage time of a first voltage on the primary winding and a second inner phase-shift angle which is a zero-voltage time of a second voltage on the secondary winding based on a current of the transformer measured by a current sensor; and
generating signals to control switch devices on the first H-bridge and the second H-bridge based on the outer phase-shift angle, the first inner phase-shift angle, and the second phase-shift angle.

20. The method of claim 19, wherein one of the first inner phase-shift angle or the second inner phase-shift angle has a non-zero value, and the other of the first inner phase-shift angle or the second inner phase-shift angle has a zero value.

21. The method of claim 19, further comprising measuring the current of the transform by the current sensor.

22. The method of claim 19, further comprising reducing a root mean square (RMS) value of the current of the transformer by iteratively adjusting the first inner phase-shift angle and the second inner phase-shift angle.

23. The method of claim 19, wherein the first H-bridge comprises a first switch device and a second switch device disposed on a first leg of the first H-bridge and a third switch device and a fourth switch device disposed on a second leg of the first H-bridge, wherein the second H-bridge comprises a fifth switch device and a sixth switch device disposed on a first leg of the second H-bridge and a seventh switch device and an eighth switch device disposed on a second leg of the second H-bridge, and wherein the method comprises generating signals to control the on/off state for each of the first switch device, the second switch device, the third switch device, the fourth switch device, the fifth switch device, the sixth switch device, the seventh switch device, and the eighth switch device based on the outer phase-shift angle, the first inner phase-shift angle, and the second phase-shift angle.

24. The method of claim 23, wherein the on/off states of the first switch device and the second switch device are opposite, the on/off states of the third switch device and the fourth switch device are opposite, the on/off states of the fifth switch device and the sixth switch device are opposite, and the on/off states of the seventh switch device and the eighth switch device are opposite.

25. The method of claim 23, further comprising:
determining a first RMS value of the current of the transformer corresponding to a first angle value of the first inner phase-shift angle;
changing the first inner phase-shift angle to a second angle value;
determining a second RMS value of the current of the transformer corresponding to the second angle value of the first inner phase-shift angle;
determining whether the second RMS value is less than the first RMS value;
determining whether the second angle value is greater than the first angle value; and
changing the first inner phase-shift angle to a third value that is greater than the second value in response to determining that the second RMS value is less than the first RMS value and that the second angle value is greater than the first angle value, or in response to determining that the second RMS value is not less than the RMS value and that the second angle value is less than the first angle value.

26. The method of claim 23, further comprising:
determining a first RMS value of the current of the transformer corresponding to a first angle value of the first inner phase-shift angle;
changing the first inner phase-shift angle to a second angle value;
determining a second RMS value of the current of the transformer corresponding to the second angle value of the first inner phase-shift angle;
determining whether the second RMS value is less than the first RMS value;
determining whether the second angle value is greater than the first angle value; and
changing the first inner phase-shift angle to a third value that is less than the second value in response to determining that the second RMS value is less than the first RMS value and that the second angle value is less than the first angle value, or in response to determining that the second RMS value is not less than the RMS value and that the second angle value is greater than the first angle value.

27. The method of claim 19, wherein the first inner phase-shift angle has a non-zero value equal to the second inner phase-shift angle.

28. The method of claim 19, wherein the first inner phase-shift angle has a first non-zero value, and the second inner phase-shift angle has a second non-zero value different than the first non-zero value.

* * * * *